United States Patent
Kim et al.

(10) Patent No.: US 8,761,551 B2
(45) Date of Patent: Jun. 24, 2014

(54) OPTICAL FLEXIBLE PRINTED CIRCUIT BOARD WITH OPTICAL WAVEGUIDES AND METHOD MANUFACTURING THE SAME

(75) Inventors: Sang Hoon Kim, Gunpo-si (KR); Jong Ha Park, Suwon-si (KR); Han Seo Cho, Seoul (KR); Joon Sung Kim, Suwon-si (KR); Jae Hyun Jung, Ansan-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 728 days.

(21) Appl. No.: 12/926,364

(22) Filed: Nov. 12, 2010

(65) Prior Publication Data

US 2011/0317957 A1    Dec. 29, 2011

(30) Foreign Application Priority Data

Jun. 23, 2010    (KR) .................. 10-2010-0059574

(51) Int. Cl.
*G02B 6/12* (2006.01)

(52) U.S. Cl.
USPC .......................................... 385/14; 156/272.2

(58) Field of Classification Search
None
See application file for complete search history.

(56) References Cited

U.S. PATENT DOCUMENTS

| | | | |
|---|---|---|---|
| 6,542,525 B1* | 4/2003 | Matsumoto et al. | 372/26 |
| 2002/0039464 A1* | 4/2002 | Yoshimura et al. | 385/14 |
| 2005/0002618 A1 | 1/2005 | Miyamae et al. | |
| 2007/0154134 A1* | 7/2007 | Ha et al. | 385/14 |
| 2009/0190878 A1* | 7/2009 | Yanagisawa | 385/14 |
| 2013/0209028 A1* | 8/2013 | Fujiwara et al. | 385/14 |

FOREIGN PATENT DOCUMENTS

| | | |
|---|---|---|
| JP | 57-46212 | 3/1982 |
| JP | 2006-156439 | 6/2006 |
| JP | 2008-122908 | 5/2008 |
| JP | 2008-203687 | 9/2008 |
| JP | 2008-203694 | 9/2008 |
| KR | 10-2005-0017210 | 2/2005 |
| KR | 10-2005-0084025 | 8/2005 |
| KR | 10-2009-0047109 | 5/2009 |
| KR | 10-2010-0066155 | 6/2010 |

OTHER PUBLICATIONS

Korean Office Action issued Aug. 19, 2011 in corresponding Korean Patent Application No. 10-2010-0059574.
Korean Notice of Allowance issued Jan. 6, 2012 in corresponding Korean Patent Application No. 10-2010-0059574.
Japanese Office Action issued May 8, 2012 in corresponding Japanese Patent Application No. 2010-262294.

* cited by examiner

*Primary Examiner* — Hemang Sanghavi

(57) ABSTRACT

The present invention provides an optical flexible printed circuit board comprising: a base layer; an optical waveguide pattern disposed on a partial region of the base layer; an insulating layer which is disposed on the base layer with the optical waveguide pattern and has a surface profile bent by the optical waveguide pattern; and circuit wires disposed on one surface of the base layer.

18 Claims, 5 Drawing Sheets

OPTICAL FLEXIBLE PRINTED CIRCUIT BOARD WITH OPTICAL WAVEGUIDES AND METHOD MANUFACTURING THE SAME

CROSS-REFERENCE TO RELATED APPLICATIONS

This application claims the benefit of Korean Patent Application No. 10-2010-0059574 filed with the Korea Intellectual Property Office on Jun. 23, 2010, the disclosure of which is incorporated herein by reference.

BACKGROUND OF THE INVENTION

1. Field of the Invention

The present invention relates to an optical flexible printed circuit board; and, more particularly, to an optical flexible printed circuit board which includes an optical waveguide pattern disposed on a partial region and an insulating layer with a surface profile by the optical waveguide pattern, and a method for manufacturing the same.

2. Description of the Related Art

As a printed circuit board technology employing conventional cupper-based electric wires fails to satisfy requirements of high-speed and high-capacity of data in electronic parts, a rapid research has recently been conducted on an optical flexible printed circuit board.

An optical flexible printed circuit board includes an optical waveguide for transmission of optical signals, and metal wires for transmission of electrical signals, so that it is possible to increase a bandwidth of data transfer, reduce power consumed during long-distance transmission, and increase wiring density.

As such, an optical flexible printed circuit board has been manufactured by lamination of an optical waveguide layer and a metal wiring layer which can transmit and receive signal in a format of rays by using polymer and optical fibers.

However, in case where an optical flexible printed circuit board is manufacture by lamination of the optical waveguide layer and the metal wiring layer, an increase in the board's thickness may increase bending rigidity of the board itself. Thus, in case where the board is warped, bending stresses applied to edge surfaces of the board (i.e., upper surface and lower surface of the board) are higher than those of its center.

In this case, lamination of the optical waveguide pattern and the metal wire layers makes them closer to upper and lower surfaces than the center of the board, that is, edge surfaces, and thus the layers may be damaged by bending stresses. Therefore, it is a need to develop an optical flexible printed circuit board with a bending reliability.

SUMMARY OF THE INVENTION

The present invention has been proposed in order to overcome the above-described problems and it is, therefore, an object of the present invention to provide an optical flexible printed circuit board which is provided with an optical waveguide pattern disposed on a partial region, and an insulating layer with a surface profile by the optical waveguide pattern, so that it is possible to reduce bending stress so as to ensure a bending reliability, and a method for manufacturing the same.

Further, another object of the present invention is to provide an optical flexible printed circuit board including: a base layer; an optical waveguide pattern disposed on a partial region of the base layer; an insulating layer which is disposed on the base layer with the optical waveguide pattern and has a surface profile bent by the optical waveguide pattern; and circuit wires disposed on one surface of the base layer.

Herein, the optical flexible printed circuit board further includes a cover lay disposed on a lower surface of the base layer with the circuit wires, and the circuit wires are disposed on a lower surface of the base layer corresponding to regions lower than other regions in the surface profile.

Also, the circuit wires are disposed on an upper surface of the base layer corresponding to regions lower than other regions in the surface profile, and the insulating layer covers the circuit wires.

Also, the base layer includes an additional surface profile downwardly bent by the optical waveguide pattern.

Also, the surface profile and the additional surface profile have an up and down symmetrical structure.

In accordance with one aspect of the present invention to achieve the object, there is provided a method for manufacturing an optical flexible printed circuit board including the steps of: providing a base layer; forming an optical waveguide pattern on a partial region of the base layer; forming an insulating layer with a surface profile bent by the optical waveguide pattern on the base layer with the optical waveguide pattern; and forming circuit wires on at least one surface of the base layer.

The step of forming the optical waveguide pattern includes the steps of: forming a lower clad pattern on the base layer; forming a core pattern on the lower clad pattern; and forming an upper clad pattern on the lower clad pattern with the core pattern.

Also, in the step of providing the base layer, a metal layer is further provided on the lower surface of the base layer, and the metal layer is subjected to patterning to thereby form the circuit wires on regions lower than other regions in the surface profile.

Also, the method includes a step of forming a cover lay on the lower surface of the base layer with the circuit wires.

Also, the insulating layer is formed by a thermo-compression process using an insulating film.

In accordance with still another aspect of the present invention to achieve the object, there is provided a method for manufacturing an optical flexible printed circuit board including the steps of: providing a base layer; forming an optical waveguide pattern on a partial region of the base layer; forming an insulating layer bent by the optical waveguide pattern and an additional surface profile downwardly bent by the optical waveguide pattern on the base layer, wherein the insulating layer is formed by attaching an insulating film with a base film on the base layer with the optical waveguide pattern in a thermo-compression process; removing the base film; and forming circuit wires on at least one surface of the base layer.

Herein, the surface profile and the additional surface profile have an up and down symmetrical structure.

Also, the base film includes a polyethylene terephthalate (PET).

Also, the step of forming the optical waveguide pattern includes the steps of: forming a lower clad pattern on the base layer; forming a core pattern on the lower clad pattern; and forming an upper clad pattern on the lower clad pattern with the core pattern.

Also, in the step of providing the base layer, a metal layer is further provided on the lower surface of the base layer, and the metal layer is subjected to patterning to thereby form the circuit wires to correspond to regions lower than other regions in the surface profile.

The method further includes a step of forming a cover lay on a lower surface of the base layer with the circuit wires.

In accordance with still another aspect of the present invention to achieve the object, there is provided a method for manufacturing an optical flexible printed circuit board including the steps of: forming circuit wires on an upper part of a base layer; forming an optical waveguide pattern on an upper part of the base layer where the circuit wires are formed; and forming an insulating layer disposed on the base layer with the optical waveguide pattern and the circuit wires, wherein the insulating layer includes a surface profile whose height is lower in formation regions of the circuit wires than in a formation region of the optical waveguide pattern.

Herein, the step of forming the optical waveguide pattern includes the steps of: forming a lower clad pattern on the base layer; forming a core pattern on the lower clad pattern; and forming an upper clad pattern on the lower clad pattern with the core pattern.

Also, the insulating layer is formed by using a thermo-compression process using an insulating film.

Also, in the step of forming the insulating layer, the insulating with the surface profile bent by the optical waveguide pattern and an additional surface profile downwardly bent by the optical waveguide pattern are formed on the base layer.

Also, the surface profile and the additional surface profile have an up and down symmetrical structure.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
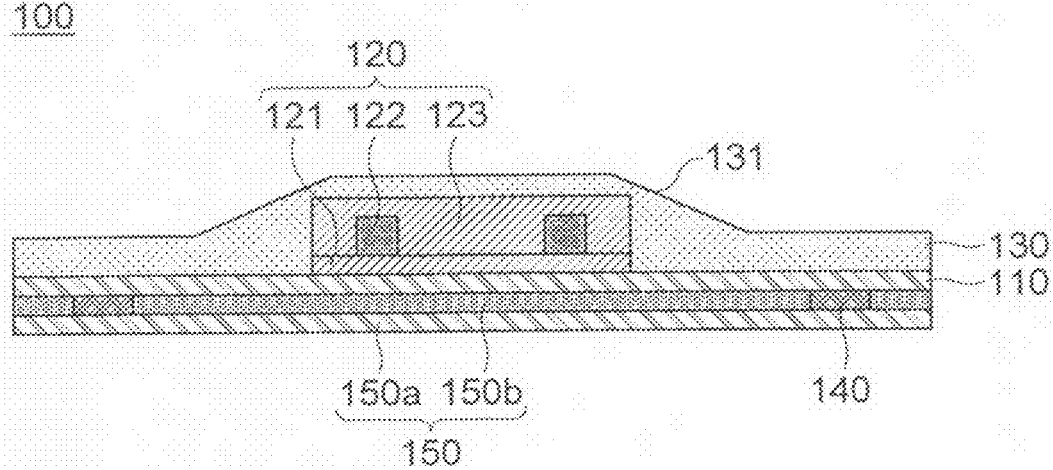
FIG. 1 is a cross-sectional view of an optical flexible printed circuit board in accordance with a first embodiment of the present invention.

Embodiments of an optical flexible printed circuit board in accordance with the present invention will be described in detail with reference to the accompanying drawings. When describing them with reference to the drawings, the same or corresponding component is represented by the same reference numeral and repeated description thereof will be omitted. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements. Further, the dimensions of layers and regions are exaggerated for clarity of illustration.

FIG. 1 is a cross-sectional view of an optical flexible printed circuit board in accordance with a first embodiment of the present invention.

Referring to FIG. 1, the optical flexible printed circuit board 100 according to the first embodiment of the present invention may include a base layer 110, an optical waveguide pattern 120, an insulating layer 130, and circuit wires 140.

In particular, the base layer 110 may include polyimide (PI) as a polymer of imide monomers. Although it is illustrated that the base layer 110 is made of a material of polyimide, the present invention is not limited thereto. For example, the base layer 110 may be formed of other resin and have flexibility. Herein, as for the resin, acrylic resin, silicon resin, urethane resin, and so on may be exemplified.

The optical waveguide pattern 120 may be disposed on a partial region of the base layer 110. That is, the optical waveguide pattern 120 may be disposed selectively on a desired region alone.

The optical waveguide pattern 120 may include a lower clad pattern 121, a core pattern 122, and an upper clad pattern 123. The core pattern 122 is disposed on the lower clad pattern 121 and the upper clad pattern 123 is disposed on the lower clad pattern 121 with the core pattern 122. That is, the core pattern 122 may be covered with the lower and upper clad patterns 121 and 123. In this case, the core pattern 122 has a higher refractive index than those of the lower and upper clad patterns 121 and 123, so that incident light on the core pattern 122 may be totally reflected by the lower clad pattern 121 and the upper clad pattern 123 to thereby be transmitted through the core pattern 122. That is, the core pattern 122 may play a role of a channel through which optical signals can be transferred.

It is illustrated that the optical waveguide pattern 120 has a quadrangle cross section. However, the present invention is not limited thereto, and may have various modifications.

Thus, the optical flexible printed circuit board 100 is provided with the optical waveguide pattern 120 whose width is formed to be narrow, and thus the whole bending rigidity of the optical flexible printed circuit board 100 is lowered, so that it can be easily flexible by external force. Also, a decrease in the whole bending rigidity of the optical flexible printed circuit board 100 may reduce a bending stress applied to the upper and lower surfaces of the optical flexible printed circuit board 100 when the optical flexible printed circuit board 100 is warped. Thus, bending stresses to be applied to the optical waveguide pattern 120 or the circuit wires 140 of the optical flexible printed circuit board 100 may be reduced, which causes a decrease in damages of the optical waveguide pattern 120 and the circuit wires 140. That is, it is possible to enhance a bending reliability of the optical flexible printed circuit board 100.

The insulating layer 130 may be disposed on the base layer 110 with the optical waveguide pattern 120. In this case, the insulating layer 130 may be formed to cover the optical waveguide pattern 120, thereby protecting the optical waveguide pattern 120 from the external force. This is because edges of the optical waveguide pattern 120, that is, each corner, have weak flexibilities which may result in frequent damage.

The insulating layer 130 may be formed of a material with durability to protect the optical waveguide pattern 120. For example, the insulating layer 130 may be formed of polyimide resin, epoxy resin, and acrylate resin, and so on, and the present invention is not limited thereto.

The insulating layer 130 has a surface profile 131 upwardly bent by the optical waveguide pattern 120. Herein, on the basis of the upper surface of the base layer 110, the insulating layer 130 disposed where the optical waveguide pattern 120 is formed may be higher than that of the insulating layer 130 disposed on the other regions. That is, in the optical flexible printed circuit board 100 of the present invention, it is possible to reduce the thickness of remaining regions except for the region occupied by the optical waveguide pattern 120.

The circuit wires 140 may be disposed on the lower surface of the base layer 110. Herein, each of the circuit wires 140 may be disposed to correspond to a region lower than other regions in the surface profile 131 of the insulating layer. That is, each of the circuit wires 140 may be disposed on a region with a small thickness in the optical flexible printed circuit board 100. Thus, each of the circuit wires 140 may be disposed on a region with the smallest bending rigidity in the optical flexible printed circuit board 100, so when the optical flexible printed circuit board 100 is warped, bending stresses applied to the circuit wires 140 may be reduced as well. Therefore, it is possible to reduce damage of the circuit wires 140 due to the bending stresses.

In addition, a cover lay 150 may be further disposed on the lower surface of the base layer 110 with the circuit wires 140. The cover lay 150 may play a role of protecting the circuit wires 140. Herein, the cover lay 150 may include a dielectric layer 150a and an adhesive layer 150b. As for the material of the dielectric layer 150a, polyimide may be exemplified. In this case, by the adhesive layer 150b, the cover lay 150 may be attached on the base layer 110.

However, the shape of the cover lay 150 is not limited by the embodiment of the present invention, and the cover lay 150 may be formed of only a dielectric layer made by being coated with a dielectric material.

Therefore, as in the embodiment of the present invention, the optical flexible printed circuit board has an optical waveguide pattern formed on its partial region, and an insulating layer with the surface profile bent by the optical waveguide pattern, thereby reducing a bending rigidity of the optical flexible printed circuit board 100.

Also, when the optical flexible printed circuit board is warped, bending stresses to be applied to the optical waveguide pattern or the circuit wire can be reduced, so that it is possible to ensure bending reliability.

Figure 2:
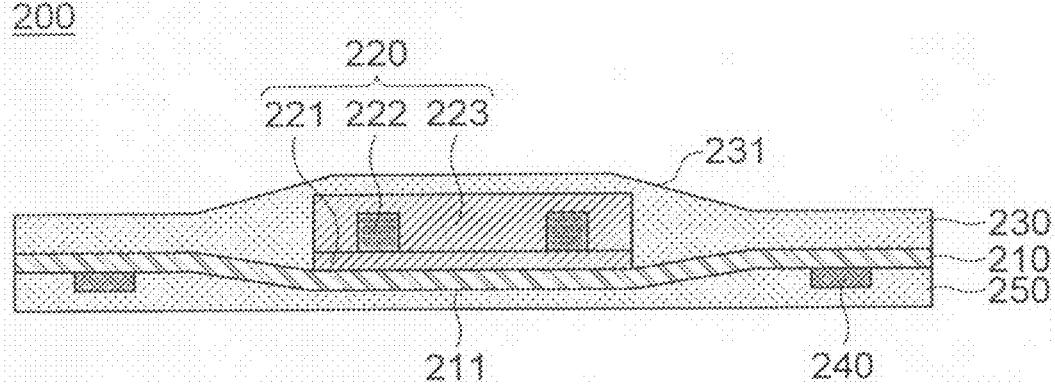
FIG. 2 is a cross-sectional view of an optical flexible printed circuit board in accordance with a second embodiment of the present invention.

FIG. 2 is a cross-sectional view of an optical flexible printed circuit board in accordance with a second embodiment of the present invention.

Herein, the optical flexible printed circuit board of the second embodiment of the present invention has the same technical construction as that of the first embodiment of the present invention, except that the base layer has an additional surface profile. Therefore, the repeated description thereof will be omitted.

Referring to FIG. 2, the optical flexible printed circuit board 200 according to the second embodiment of the present invention may include a base layer 210, an optical waveguide pattern 220, an insulating layer 230, and circuit wires 240. The optical waveguide pattern 220 is disposed on a partial region of the base layer 210, and the insulating layer 230 is disposed on the base layer 210 with the optical waveguide pattern 220 and has a surface profile 231 bent by the optical waveguide pattern 220. The circuit wire 240 is disposed on the lower surface of the base layer 210.

Herein, the optical waveguide pattern 220 may include a core pattern 222, a lower clad pattern 221, and an upper clad pattern 223. Each of the upper and lower clad patterns 221 and 223 is disposed on the upper and lower parts of the core pattern 222 in such a manner to cover the core pattern 222.

Herein, in case where the optical flexible printed circuit board 200 is warped, as the optical waveguide pattern 220 is disposed to be closer to the lower surface of the optical flexible printed circuit board 200, the optical waveguide pattern 220 is greatly influenced by the bending stresses, and thus the optical waveguide pattern 220 may be readily defective.

In order to solve this problem, the base layer 210 may include an additional surface profile 211 bent downward by the optical waveguide pattern 220. Thus, the optical waveguide pattern 220 of the present invention may be less influenced by the bending stress than that in the prior art, since it can be moved to the center from the lower surface of the optical flexible printed circuit board 200.

In addition, a surface profile 231 of the insulating layer 230 and the additional surface profile 211 of the base layer 210 may have an up and down symmetrical structure. Thus, the optical waveguide pattern 220 may be moved to be even closer to the center within the optical flexible printed circuit board 200.

Also, each of the circuit wires 240 may be disposed on the lower surface of the base layer 210 corresponding to a lower region than other regions in the surface profile 231. Thus, each of the circuit wires 240 may be disposed on a region with a small thickness in the optical flexible printed circuit board 200, when the optical flexible printed circuit board is warped, so the circuit wires 240 are less suffered from damage by the bending stresses.

Also, it is illustrated with the assumption that the cover lay 250 for covering the circuit wires 240 is formed of a dielectric layer, the present invention is not limited thereto. The cover lay 250 may be formed of a dielectric layer and an adhesive layer.

Therefore, as in the embodiment of the present invention, the surface profile down-ward bent, as well as the insulating layer are formed on the base layer for supporting the optical waveguide pattern, thereby effectively reducing bending stress applied to the optical waveguide pattern or the circuit wires, so that it is possible to implement higher bending reliability.

Figure 3:
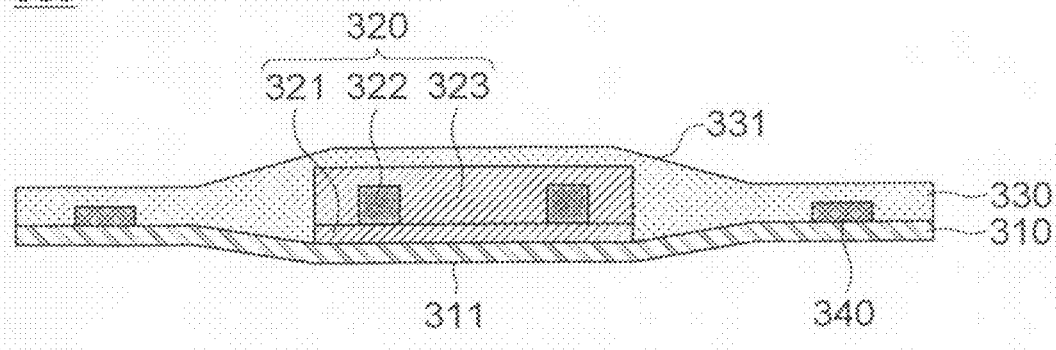
FIG. 3 is a cross-sectional view of an optical flexible printed circuit board in accordance with a third embodiment of the present invention.

FIG. 3 is a cross-sectional view of an optical flexible printed circuit board in accordance with a third embodiment of the present invention.

Herein, the optical flexible printed circuit board according to the third embodiment of the present invention has the same technical construction as that of the second embodiment of the present invention, except for formation locations of circuit wires. Therefore, the repeated description thereof will be omitted.

Referring to FIG. 3, the optical flexible printed circuit board 300 according to the third embodiment of the present invention may include a base layer 310, an optical waveguide pattern 320, an insulating layer 330, and circuit wires 340. The optical waveguide pattern 320 is disposed on a partial region of the base layer 310, and the insulating layer 330 is disposed on the base layer 310 with the optical waveguide pattern 320 and has the insulating layer 330 with the surface profile 331 bent by the optical waveguide pattern 320. Each of the circuit wires 340 is disposed on one surface of the base layer 310.

Herein, the optical waveguide pattern 320 may include a lower clad pattern 321, a core pattern 322, and an upper clad pattern 323 which are sequentially formed on the base layer 310.

Herein, the circuit wires 340 may be disposed on the same layer as the optical waveguide pattern 320 is disposed. That is, the circuit wires 340 may be covered by the insulating layer 330. Thus, the circuit wires 340 may be protected by the insulating layer 330, so there is no need to provide a separate cover lay on the lower surface of the base layer 310.

In the embodiment of the present invention, it is illustrated with the assumption that the base layer 310 has an additional surface profile 311, the present invention is not limited thereto, and the base layer 310 may also be formed to be flat.

Therefore, as in the embodiment of the present invention, the circuit wires are disposed on the same layer as the optical waveguide pattern is disposed, and thus there is no need to provide a separate cover lay, and accordingly, it is possible to reduce a cost taken for materials.

Also, since there is no need to further provide a cover lay, it is possible to reduce the thickness of the optical flexible printed circuit board 100. Therefore, the optical flexible printed circuit board may have a reduced bending rigidity, which results in a decrease in the bending stress applied to the circuit wires or the optical waveguide pattern.

FIGS. 4 to 9 are cross-sectional views of a process of manufacturing the optical flexible printed circuit board in accordance with a fourth embodiment of the present invention, respectively.

Figure 4:
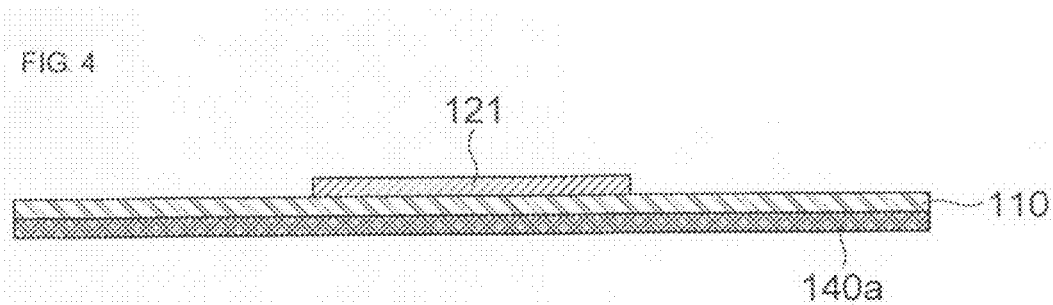
FIGS. 4 to 9 are cross-sectional views of a process of manufacturing an optical flexible printed circuit board in accordance with a fourth embodiment of the present invention, respectively.

Referring to FIG. 4, in order to manufacture the optical flexible printed circuit board in accordance with the fourth embodiment of the present invention, the base layer 110 is provided.

Herein, the base layer 110 may include a polyimide. The material of the polyimide is not limited by the present invention. For example, the base layer 110 may be formed of the same resin. Herein, as for the resin, acrylic resin, silicon resin, urethane resin, and so on may be exemplified.

In addition, the metal layer 140a may be further provided on the lower surface of the base layer 110. Herein, the metal layer 140a may be used for formation of the circuit wires 140 in the subsequent process. Also, the metal layer 140a may play a role of supporting the base layer 110 in the subsequent process.

Thereafter, the lower clad pattern 121 is formed on the partial region of the base layer 110.

Herein, the lower clad pattern 121 may be formed by using clad materials made in a liquid type or a film type. For example, in case where the lower clad pattern 121 is formed by using the liquid clad material, the liquid clad material is coated and cured on the base layer 110 to thereby form the lower clad pattern 121. Herein, the coating method includes a dispending method, an ink-jet printing method, a spray coating method, a deep coating method, a roll coating method, and so on. In this case, when the liquid clad material is coated on the whole surfaces of the base layer 110, a mask is used to perform partial curing through a selective UV scanning, and then a developing process is performed, thereby forming the lower clad pattern 121 disposed only on a partial region of the base layer 110.

Also, in case where the lower clad pattern 121 is formed by using a clad material of a film type, the lower clad pattern 121 may be formed by using a laminator.

Figure 5:
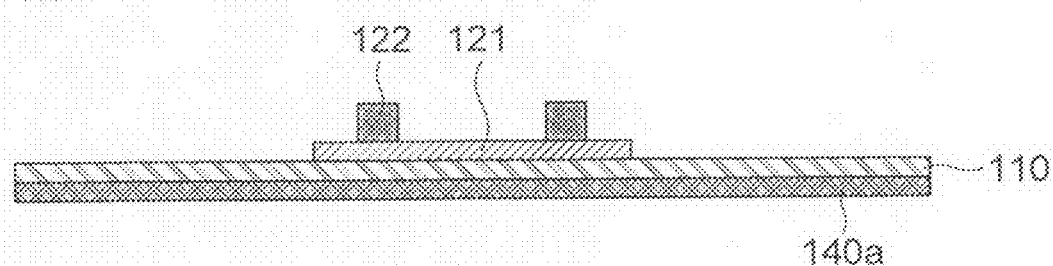

Referring to FIG. 5, after the lower clad pattern 121 is formed, the core pattern 122 is formed on the lower clad pattern 121. Herein, after being coated with a core material, the core pattern 122 may be formed by being subjected to a curing process through a selective UV scanning using a mask. However, the present invention is not limited thereto, and the core pattern 122 may be formed by other methods, including a laminating method, a molding method, a laser writing method, and so on.

Figure 6:
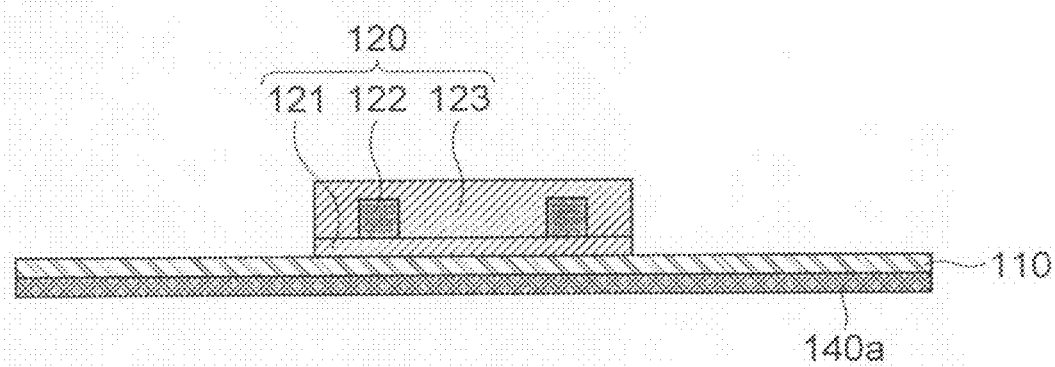

Referring to FIG. 6, the core pattern 122 is formed, and then the upper clad pattern 123 is formed on the lower clad pattern 121 with the core pattern 122, thereby forming the optical waveguide pattern 120, including the lower clad pattern 121, the core pattern 122, and the upper clad pattern 123, on the partial region of the base layer 110.

Herein, the upper clad pattern 123 may be formed by using the method for formation of the lower clad pattern 121. Thus, the detailed description for formation of the upper clad pattern 123 will be omitted.

The core pattern 122 is covered by the lower clad pattern 121 and the upper clad pattern 123. In this case, the core pattern 122 has a higher refractive index than those of the lower clad pattern 121 and the upper clad pattern 123, and thus the incident light on the core pattern 122 may be moved within the core pattern 122 through all reflection by the lower clad pattern 121 and the upper clad pattern 123.

Figure 7:
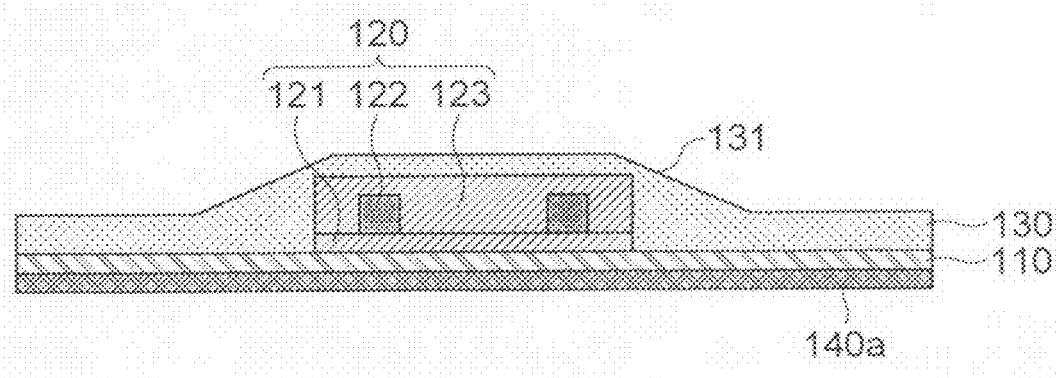

Referring to FIG. 7, after the optical waveguide pattern 120 is formed, there is formed the insulating layer 130 with the surface profile 131 bent by the optical waveguide pattern 120, on the base layer 110.

Herein, the insulating layer 130 may be formed by a thermo-compression process. As for the thermo-compression process, a vacuum lamination process, a vacuum high-temperature press process, and so on may be exemplified. In the thermo-compression process, a film for formation of the insulating layer 130 is softened and adhered closely on the base layer 110 with the optical waveguide pattern 120. In this case, the surface profile 131 bent by the optical waveguide pattern 120 projected from the base layer 110, that is, the surface profile 131 projected from the surface thereof, may be formed on the insulating layer 130. Thus, the base layer 110 with the optical waveguide pattern 120 and the insulating layer 130 may be formed to have a different thickness according to each of their formation regions. That is, other regions may be formed to be thinner than the region where the optical waveguide pattern 120 is formed.

As for the resin of formation of the insulating layer 130, a polyimide resin, epoxy resin, and acrylate resin, and so on may be exemplified. However, the present invention is not limited thereto.

Figure 8:
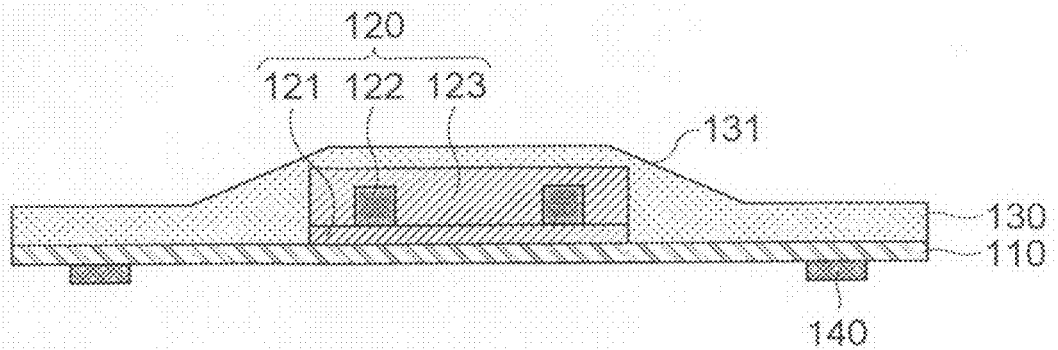

Referring to FIG. 8, after the insulating layer 130 is formed, the metal layer 140a disposed on the lower surface of the base layer 110 is subjected to a patterning process, thereby forming the circuit wires 140. However, the present invention is not limited thereto. For example, another method of forming the circuit wires 140 may be achieved through a photo process and a plating process using a metal layer as a plating seed layer. For example, the method for forming the circuit wires 140 may include a semi additive process or an additive process.

Herein, the circuit wires 140 may be formed on the lower surface of the base layer 110 which corresponds to regions lower than other regions in the surface profile 131 of the insulating layer 130. Thus, since the circuit wires 140 are disposed on a region with a relatively thinner thickness than that of other regions, it is possible to reduce the bending stress applied to the circuit wires 140.

Figure 9:
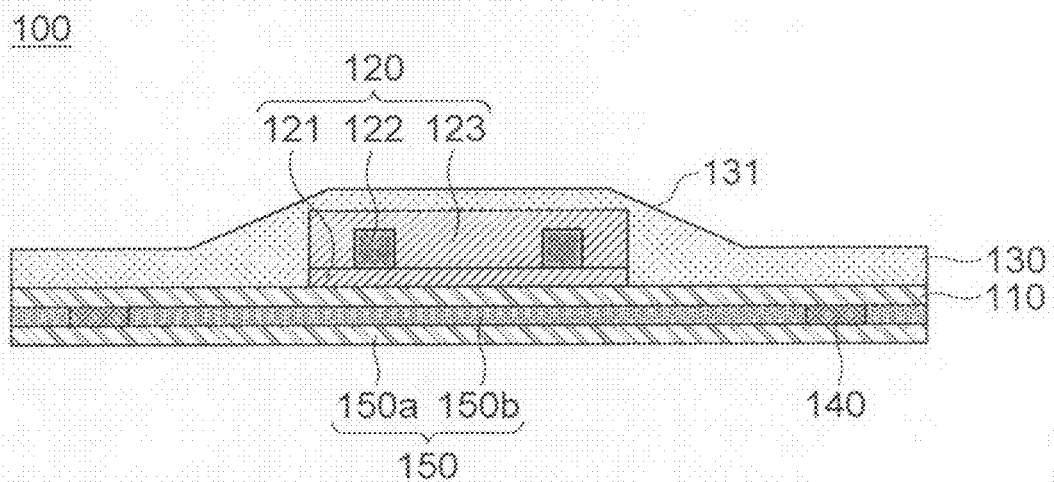

Referring to FIG. 9, after the circuit wires 140 are formed, there is formed the cover lay 150 for protecting the circuit wires 140 from the outside. Herein, the cover lay 150 may include an adhesive layer 150b and the dielectric layer 150a.

In this case, the cover lay 150 may be formed by being attached on the lower part of the base layer 110 with the circuit wires 140 through the adhesive layer 150b. In the embodiment of the present invention, the method for forming the cover lay 150 is not limited by the present invention. For example, the cover lay 150 may be also formed by being coated with the dielectric materials. In this case, the cover lay 150 may be structured in a single layer made by the dielectric layer.

Therefore, as in the embodiment of the present invention, the optical waveguide pattern is formed on the partial region, and the insulating layer with the surface profile is formed by the optical waveguide pattern, so that it is possible to reduce the whole bending rigidity of the optical flexible printed circuit board since the remaining regions except for the formation region of the optical flexible printed circuit board have thin thicknesses. Thus, it is possible to reduce the bending stress applied to the optical waveguide pattern or the circuit wire, thereby ensuring bending reliability.

FIGS. 10 to 14 are cross-sectional views of a process of manufacturing the optical flexible printed circuit board in accordance with a fifth embodiment of the present invention, respectively.

Herein, the same manufacturing process as that of the optical flexible printed circuit board according to the fourth embodiment will be given except for the formation of the additional surface profile on the base layer. Therefore, the repeated description thereof will be omitted.

Figure 10:
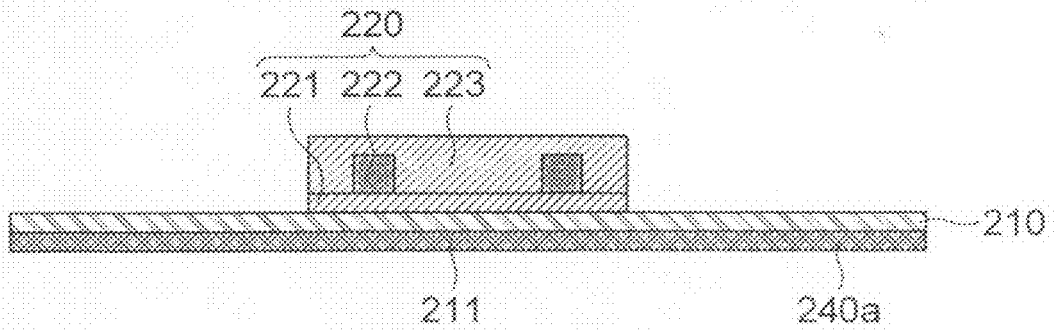
FIGS. 10 to 14 are cross-sectional views of a process of manufacturing an optical flexible printed circuit board in accordance with a fifth embodiment of the present invention, respectively.

Referring to FIG. 10, in order to manufacture the optical flexible printed circuit board in accordance with the fifth embodiment of the present invention, the optical waveguide pattern 220 is formed on a partial region of the base layer 210 which is provided with the metal layer 240a formed on its lower surface. Herein, the optical waveguide pattern 220 may include a lower clad pattern 221, the core pattern 222, and the upper clad pattern 223, all of which are sequentially formed on the base layer 210.

Figure 11:
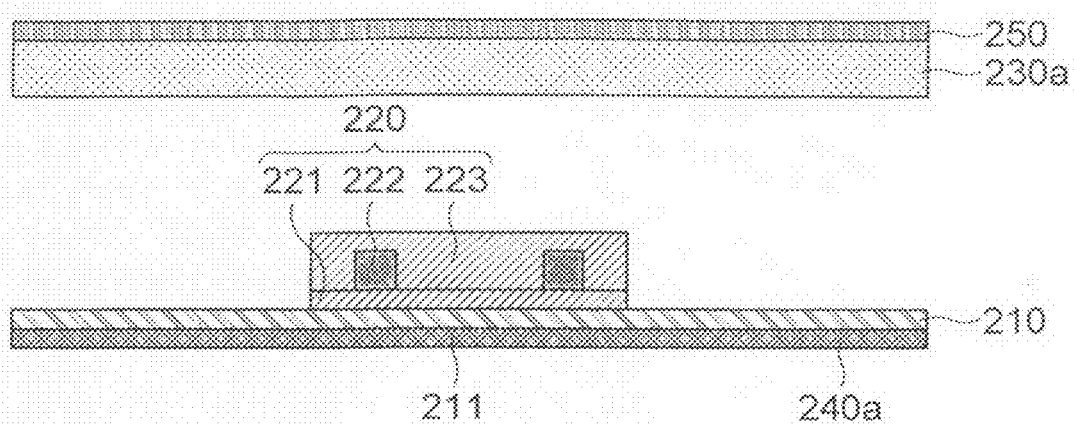
Figure 12:
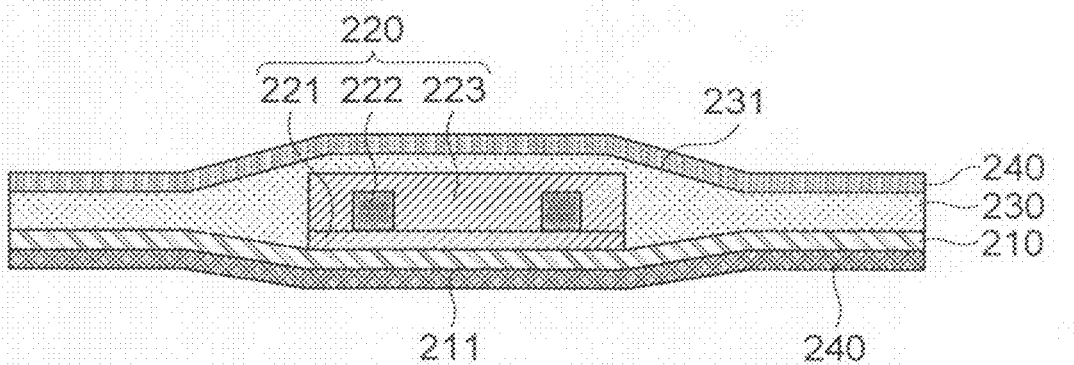

Referring to FIG. 11, after the optical waveguide pattern 220 is formed, an insulating film 230a with the base film 250 is subjected to a thermo-compression process in such a manner to be attached on the base layer 210 with the optical waveguide pattern 220, as in FIG. 12, so that it is possible to form the insulating layer 230 with the surface profile 231 bent by the optical waveguide pattern 220. Herein, according to properties of the base film 250, an additional surface profile 211 downwardly bent to correspond to the optical waveguide pattern 220 may be formed on the base layer 210. In this case, the base film 250 may be polyethylene terephthalate (PET). Also, the insulating film 230a may be formed of an insulating material of being in a semi-cured state, that is, B-stage. Herein, as for materials of the insulating film 230a, polyimide resin, polyurethane resin, acrylate resin, and so on may be exemplified. Also, the thermo-compression may use a vacuum laminator. Also, vacuum pressure may range from 0.5 to 0.8 Mpa, and the temperature may range from 50 to 80° C.

As the additional surface profile 211 is further formed on the base layer 210, the optical waveguide pattern 220 may be disposed in such a manner that the optical waveguide pattern 220 is contained within the insulating layer 230 having the base layer 210 whiling being even closer to its center. Thus, the optical waveguide pattern 220 may reduce an influence resulting from the bending stress, so that it is possible to prevent the optical flexible printed circuit board from being defective due to the bending stress. In this case, in order to dispose the optical waveguide pattern 220 to be even closer to the center from the inside of the insulating layer 230 with the base layer 210, the surface profile 231 and the additional surface profile 211 may have an up and down symmetrical structure.

Figure 13:
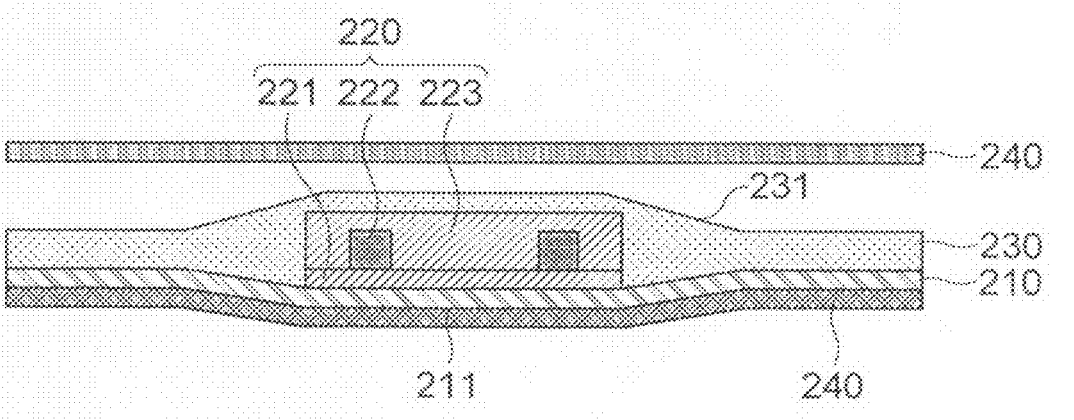

Referring to FIG. 13, after the insulating layer 230 is formed, the UV scanning is performed on the base layer 210 with the base film 250, and then is subjected to a curing process. Thereafter, the base film 250 is removed from the base layer 210.

Figure 14:
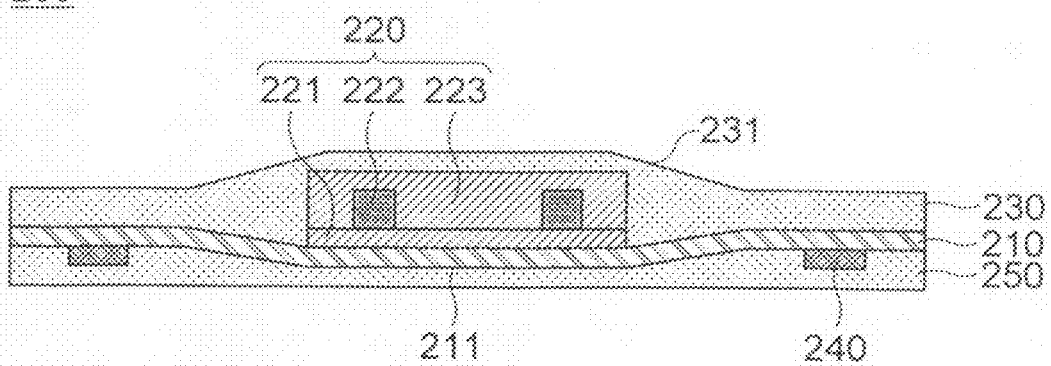

Referring to FIG. 14, after the base film 250 is removed, the metal layer 240a is subjected to a patterning to thereby form the circuit wire 240. Herein, for less influence of damage by the bending stress, the circuit wires 240 may be formed on the lower surface of the base layer 210 corresponding to a lower region than other regions in the surface profile of the insulating layer 230. That is, the circuit wires 240 may be disposed on a region with a relatively thinner thickness than those of other regions.

Thereafter, the circuit wires 240 are formed, and then the cover lay 250 is formed on the base layer 210 with the circuit wires 240. Herein, the cover lay 250 may be formed by being coated with dielectric materials. However, the present invention is not limited thereto. The cover lay may be formed through attachment through an adhesive layer.

Therefore, as in the embodiment of the present invention, a base film is used to form the additional surface profile on the base layer, so that it is possible to move the optical waveguide pattern to the center of the optical flexible printed circuit board, which results in a higher bending reliability of the optical waveguide pattern.

Figure 15:
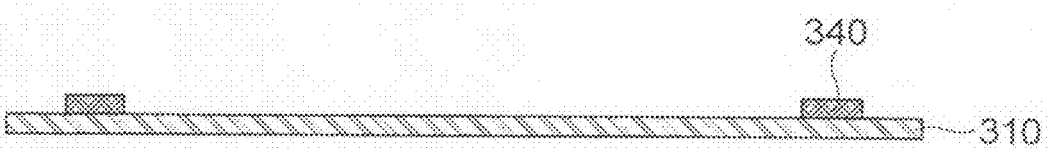
FIGS. 15 to 17 are cross-sectional views of a process of manufacturing an optical flexible printed circuit board in accordance with a sixth embodiment of the present invention, respectively.
Figure 16:
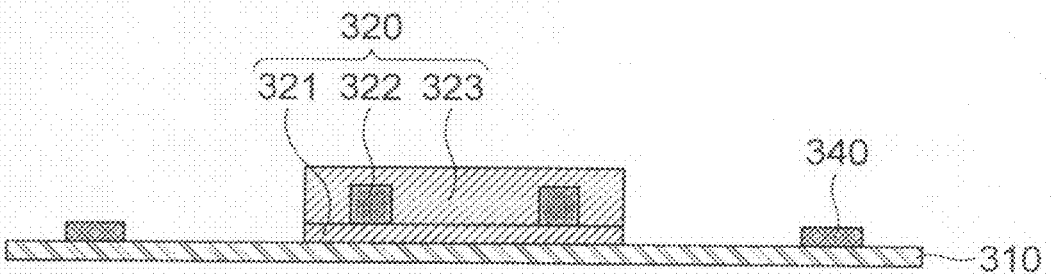
Figure 17:
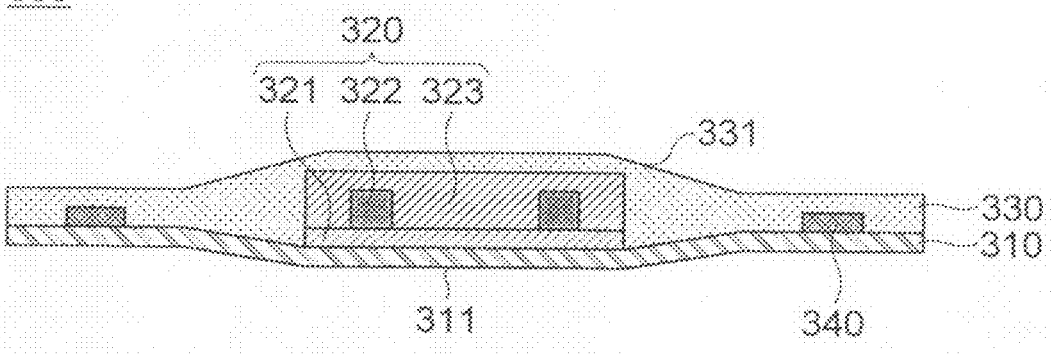

FIGS. 15 to 17 are cross-sectional views of a process of manufacturing the optical flexible printed circuit board in accordance with a sixth embodiment of the present invention, respectively.

Herein, the same manufacturing process of the optical flexible printed circuit board according to the fifth embodiment will be given except for the method for formation of the circuit wires. Therefore, the repeated description thereof will be omitted.

Referring to FIG. 15, in order to manufacture the optical flexible printed circuit board in accordance with the sixth embodiment of the present invention, the circuit wires 340 are formed on the base layer 310. Herein, the circuit wires 340 may be formed by performing patterning for the metal layer provided on the base layer 310.

Referring to FIG. 16, after the circuit wires 340 are formed, the optical waveguide pattern 320 is formed on the base layer 310. Herein, the circuit wires 340 and the optical waveguide pattern 320 may be formed on the same layer as the optical waveguide pattern 320 is disposed. Also, the optical waveguide pattern. 320 may include the lower clad pattern 321, the core pattern 322, and the upper clad pattern 323, all of which are sequentially formed on the predetermined region of the base layer 310.

Referring to FIG. 17, after the optical waveguide pattern 320 is formed, the insulating layer 330 with the surface profile 331 by the optical waveguide pattern 320 is formed on the base layer 310 with the optical waveguide pattern 320 and the circuit wires 340.

In this case, with respect to the surface profile 331, the circuit wires 340 may have a lower height than the optical waveguide pattern 320. Herein, the insulating layer 230 may be formed by a thermo-compression process employing an insulating film.

In addition, in a process of forming the insulating layer 330, the additional surface profile 331 downwardly bent by the optical waveguide pattern 320 is further formed on the base layer 310. In this case, the surface profile 331 and the additional surface profile 311 may have an up and down symmetrical structure. Therefore, as in the embodiment of the present invention, the circuit wires and the optical waveguide pattern are formed on the same layer as each other in such a manner to be covered by the insulating layer, so that it is unnecessary to form a separate cover lay for protecting circuit wires, which results in a simple process and a reduced cost.

In the optical flexible printed circuit board of the present invention, the optical waveguide pattern is partially formed, and thus bending rigidity can be reduced, so that it is possible to decrease bending stress.

Also, in the optical flexible printed circuit board of the present invention, an insulating layer with a surface profile is formed by the optical waveguide pattern, and thus circuit wires come to be thinner than other regions, so that it is possible to reduce bending stresses applied to the circuit wires.

Also, the optical flexible printed circuit board of the present invention is provided with an additional profile downwardly bent to correspond to the optical waveguide pattern, so that it is possible to dispose the optical waveguide pattern at the center of the circuit board. Therefore, it is possible to reduce bending stress applied to the optical waveguide pattern.

Also, in the optical flexible printed circuit board of the present invention, the optical waveguide is formed selectively on a desired region, and thus it is possible to reduce unnecessary consumption of high-priced materials for the optical waveguide.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A method for manufacturing an optical flexible printed circuit board comprising:
   providing a base layer;
   forming an optical waveguide pattern on a partial region of the base layer;
   forming an insulating layer covering the base layer and the optical waveguide pattern, the insulating layer having a surface profile with a portion on the optical waveguide pattern that is upwardly protruded by the optical waveguide pattern; and
   forming circuit wires on at least one surface of the base layer.

2. The method of claim 1, wherein forming the optical waveguide pattern comprises:
   forming a lower clad pattern on the base layer;
   forming a core pattern on the lower clad pattern; and
   forming an upper clad pattern on the lower clad pattern with the core pattern.

3. The method of claim 1, wherein, in providing the base layer, a metal layer is further provided on the lower surface of the base layer, and the metal layer is subjected to patterning to thereby form the circuit wires on regions lower than other regions in the surface profile.

4. The method of claim 3, further comprising forming a cover lay on the lower surface of the base layer with the circuit wires.

5. The method of claim 1, wherein the insulating layer is formed by a thermo-compression process using an insulating film.

6. The method of claim 1, wherein the insulating layer surrounds all open-surfaces of the optical waveguide pattern.

7. A method for manufacturing an optical flexible printed circuit board comprising:
   providing a base layer;
   forming an optical waveguide pattern on a partial region of the base layer;
   forming an insulating layer bent by the optical waveguide pattern and an additional surface profile downwardly bent by the optical waveguide pattern on the base layer, wherein the insulating layer is formed by attaching an insulating film with a base film on the base layer with the optical waveguide pattern in a thermo-compression process;
   removing the base film; and
   forming circuit wires on at least one surface of the base layer.

8. The method of claim 7, wherein the surface profile and the additional surface profile have an up and down symmetrical structure.

9. The method of claim 7, wherein the base film includes a polyethylene terephthalate (PET).

10. The method of claim 7, wherein forming the optical waveguide pattern comprises:
    forming a lower clad pattern on the base layer;
    forming a core pattern on the lower clad pattern; and
    forming an upper clad pattern on the lower clad pattern with the core pattern.

11. The method of claim 7, wherein, in providing the base layer, a metal layer is further provided on the lower surface of the base layer, and the metal layer is subjected to patterning to thereby form the circuit wires to correspond to regions lower than other regions in the surface profile.

12. The method of claim 7, further comprising forming a cover lay on a lower surface of the base layer with the circuit wires.

13. A method for manufacturing an optical flexible printed circuit board comprising:
    forming circuit wires on an upper part of a base layer;
    forming an optical waveguide pattern on an upper part of the base layer where the circuit wires are formed; and
    forming an insulating layer disposed on the base layer with the optical waveguide pattern and the circuit wires, wherein the insulating layer includes a surface profile whose height is lower in formation regions of the circuit wires than in a formation region of the optical waveguide pattern.

14. The method of claim 13, wherein forming the optical waveguide pattern comprises:
    forming a lower clad pattern on the base layer;
    forming a core pattern on the lower clad pattern; and
    forming an upper clad pattern on the lower clad pattern with the core pattern.

15. The method of claim 13, wherein the insulating layer is formed by using a thermo-compression process using an insulating film.

16. The method of claim 13, wherein, in forming the insulating layer, the insulating with the surface profile bent by the optical waveguide pattern and an additional surface profile downwardly bent by the optical waveguide pattern are formed on the base layer.

17. The method of claim 16, wherein the surface profile and the additional surface profile have an up and down symmetrical structure.

18. A method for manufacturing an optical flexible printed circuit board comprising:
    providing a base layer;

forming an optical waveguide pattern on a partial region of the base layer;

forming an insulating layer with a surface profile bent by the optical waveguide pattern on the base layer with the optical waveguide pattern, the insulating layer being formed by a thermo-compression process using an insulating film; and forming circuit wires on at least one surface of the base layer.

* * * * *